United States Patent [19]

Ishii et al.

[11] Patent Number: 4,973,143
[45] Date of Patent: Nov. 27, 1990

[54] ZOOM LENS SYSTEM

[75] Inventors: Atsujiro Ishii; Shinichi Mihara, both of Tokyo, Japan

[73] Assignee: Olympus Optical Co., Ltd., Tokyo, Japan

[21] Appl. No.: 428,061

[22] Filed: Oct. 27, 1989

[30] Foreign Application Priority Data

Oct. 31, 1988 [JP] Japan .................. 63-273112

[51] Int. Cl.⁵ .................. G02B 15/14; G02B 13/18
[52] U.S. Cl. .................. 350/423; 350/426; 350/432
[58] Field of Search .................. 350/423, 432, 426

[56] References Cited

U.S. PATENT DOCUMENTS 4,730,906  3/1988  Okudaira .................. 350/426

FOREIGN PATENT DOCUMENTS 52-135750 11/1977 Japan .
 58-5707  1/1983 Japan .
58-102208  6/1983 Japan .
58-153913  9/1983 Japan .
61-110112  5/1986 Japan .
62-266511 11/1987 Japan .

Primary Examiner—Bruce Y. Arnold
Assistant Examiner—Rebecca D. Gass
Attorney, Agent, or Firm—Cushman, Darby & Cushman

[57] ABSTRACT

A zoom lens system having a wide field angle, a long back focal length, a high zooming ratio, and comprising a small number of lens elements. Said zoom lens system comprises, in the order from the object side, a front lens unit having negative refractive power and a rear lens unit having positive refractive power, and is so adapted as to perform variation of focal length, said front lens unit consisting of a negative meniscus lens element having a convex surface on the object side, a negative lens element and a positive lens element, whereas said rear lens unit comprising, on the extremely image side therein, a positive lens component consisting of a positive lens element having a short radius of curvature on the image side surface thereof and a positive lens element having a short radius of curvature on the object side surface thereof.

9 Claims, 8 Drawing Sheets

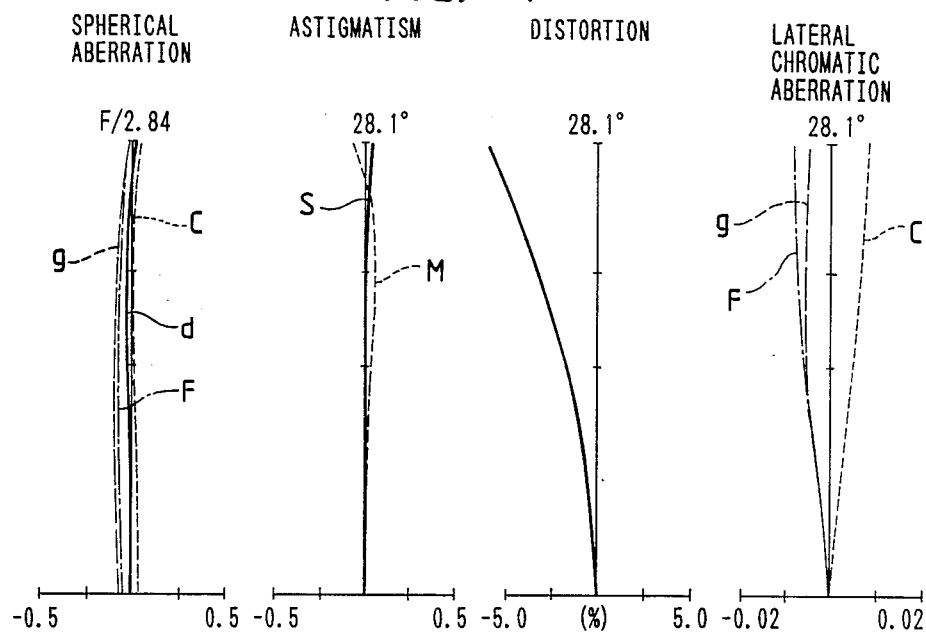
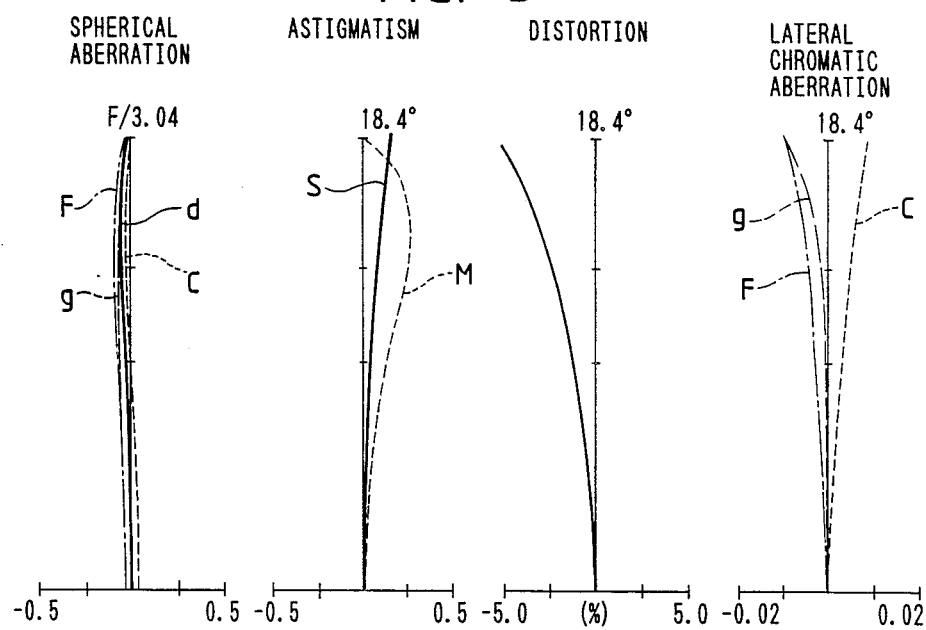

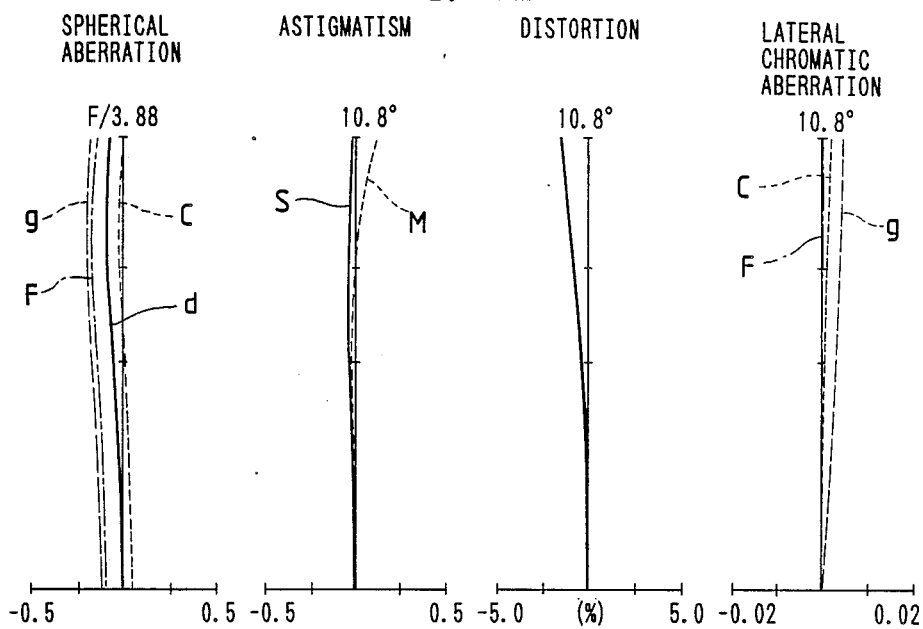

ZOOM LENS SYSTEM

BACKGROUND OF THE INVENTION (a) Field of the Invention

The present invention relates to a zoom lens system for cameras, and more specifically for video cameras.

(b) Description of the Prior Art

In recent years when compact and light-weight video cameras have been offered at low prices, there are increasing demands for domestic video cameras. In order to further expand these demands, it is necessary to develop more compact video cameras which are lighter in weight and marketable at lower prices, thereby posing problems to design lens systems which are more compact in external designs, lighter in weight and manufacturable at lower costs.

Under the present circumstances, zoom lens systems for domestic video cameras are designed mostly for a zooming ratio of 6 and aperture ratios of F/1.2 to F/1.6 because these specifications are convenient from viewpoints of both lens design and practical use. Each of these zoom lens systems for video cameras generally consists of four lens units as exemplified by Japanese Unexamined Published Patent Applications No. 102208/58 and No. 153913/58. However, each of these zoom lens systems has defects. For example the lens system comprises lens elements numbering as large as 14 to 15, the lens system requires a high manufacturing cost, the lens system has large external dimensions and the lens system is heavy in weight. Further, the zoom lens system disclosed by Japanese Unexamined Published Patent Application No. 110112/61 comprises lens elements in a reduced number of 8 owing to a large number of aspherical surfaces used therein, but requires a high manufacturing cost due to an extremely short radius of curvature adopted on a cemented surface in a cemented doublet arranged therein.

Further, the zoom lens systems each consisting of four lens units are of a type which can hardly have large field angles since diameters of the front lenses thereof are rapidly prolonged when the field angles of such zoom lens system exceed 50° at the wide positions thereof. The zoom lens systems which are designed for high vari-focal ratios and field angles far larger than 50° at the wide positions thereof have common defects that the front lenses thereof have large diameters and that the lens systems can hardly correct aberrations with a small number of lens elements. In order to correct the aberrations, these zoom lens systems must comprise a large number of lens elements and move a large number of lens units, thereby complicating compositions and requiring high manufacturing costs.

Accordingly, attention is paid to the conventionally known zoom lens system which consists of a front lens unit having negative refractive power and a rear lens unit having positive refractive power. This zoom lens system does not require remarkably prolonging the diameter of the front lens thereof even when field angle at the wide position thereof exceeds 50°, comprises a small number of lens elements, six to eight, and has a simple composition for moving two lens units only. However, this zoom lens system can hardly have a high zooming ratio nor a large aperture ratio.

Furthermore, a stop is generally arranged in the rear lens unit and moved together with the rear lens unit for varying focal length. When the above-described zoom lens system consisting of two lens units is used in a video camera comprising a large and heavy mechanism for autoiris, a complicated composition is required for moving such a heavy stop along the optical axis.

As a conventional example capable of correcting this defect, there is known the zoom lens system disclosed by Japanese Unexamined Published Patent Application No. 266511/62. This patent application discloses only the zoom lens system which consists of two lens units and comprises a stop fixed between the front lens unit and the rear lens unit, but makes no disclosure of numeric data on an actual zoom lens system. In addition, the zoom lens system disclosed by this patent application is undesirable for use with a video camera since the exit pupil is located in the vicinity of the image surface especially at the telex position of the zoom lens system.

SUMMARY OF THE INVENTION

A primary object of the present invention is to provide a compact zoom lens system light in weight and comprising a small number of lens elements.

Another object of the present invention is to provide a zoom lens system having a large aperture and a high vari-focal ratio.

A further object of the present invention is to provide a zoom lens system consisting of a front lens unit having negative refractive power and a rear lens unit having positive refractive power, and so composed as to locate the exit pupil at a position far from the image surface.

The zoom lens system according to the present invention comprises a front lens unit having negative refractive power and a rear lens unit having positive refractive power arranged in the order from the object side, and so designed as to perform variations of focal length by varying the airspace between said front lens unit and rear lens unit, said front lens unit comprising, in the order from the object side, a negative lens element, a negative lens element and a positive lens element, said rear lens unit comprising a positive lens component consisting of two positive lens elements arranged on the extreme image side therein, the positive lens element arranged on the object side in said positive lens component and having a radius of curvature on the object side surface thereof longer than that of the image side surface thereof, the positive lens element arranged on the image side in said positive lens component having a radius of curvature on the image side surface thereof longer than that of the object side surface thereof, and said positive lens elements being so designed as to satisfy the following conditions (1) and (2):

$$0 < (r_a + r_b)/(r_a - r_b) < 1.5 \quad (1)$$

$$-1.5 < (r_c + r_d)/(r_c - r_d) < 0 \quad (2)$$

wherein the reference symbols $r_a$ and $r_b$ designate radii of curvature on the object side surface and the image side surface respectively of the positive lens element arranged on the object side in said positive lens component, and the reference symbols $r_c$ and $r_d$ designate radii of curvature on the object side surface and the image side surface respectively of the positive lens element arranged on the image side in said positive lens component.

A lens system for video cameras must have a long back focal length since it is necessary to arrange a thick quartz filter and other filters between the lens system and an image surface. Further, the axial ray is high on the lens component arranged on the image side in the rear lens unit in a lens system having a large aperture ratio. Furthermore, the off axial principal ray is also high on said lens component arranged on the image side in the rear lens unit when the exit pupil is located from the image surface for a distance longer than three times the focal length of the zoom lens system at the wide position thereof. Accordingly, spherical aberration is aggravated so long as an adequate composition is not selected for the lens component arranged on the image side in the rear lens unit.

In the zoom lens system according to the present invention, the lens component arranged on the extremely image side in the rear lens unit is composed, in order from the object side, of a positive lens element having a smaller radius of curvature on the image side surface thereof than that on the object side surface thereof and a positive lens element having a smaller radius of curvature on the object side surface thereof than that on the image side surface thereof. This composition makes it possible to favorably correct spherical aberration by gradually refracting the axial ray and locate the exit pupil far from the image surface by gradually refracting the offaxial principal ray so as to emerge from the zoom lens system at a small angle relative to the optical axis. Further, the lens components composed of the two positive lens elements as described above gradually refracts the offaxial principal ray and corrects coma also favorably.

By selecting the composition described above, the present invention has succeeded in designing a compact, high performance zoom lens system having larger field angle and comprising a smaller number of lens elements than those of the conventional zoom lens systems for video cameras and electronic still cameras.

In the zoom lens system according to the present invention, spherical aberration and coma are corrected favorably by selecting shape factors for the two positive lens elements of said positive lens component so as to satisfy the conditions (1) and (2), If the lower limit of the condition (1) or the upper limit of the condition (2) is exceeded, the function of said positive lens component consisting of the two positive lens elements will be little different from that of a positive lens component consisting only of a single biconvex lens element, thereby lessening the significance of the composition of the positive lens component selected by the present invention. If the upper limit of the condition (1) or the lower limit of the condition (2) is exceeded, in contrast, spherical aberration and coma, especially of high orders, will undesirably be produced easily.

In the zoom lens system according to the present invention described above, it is possible to correct spherical aberration and coma more favorably by designing any one of the surfaces of said positive lens component as an aspherical surface having curvature which becomes lower than that on the optical axis as the surface portions are farther from the optical axis.

The present invention has been accomplished also for the purpose of enhancing vari-focal ratio and enlarging numerical aperture.

In designing a zoom lens system having a high vari-focal ratio and a large numerical aperture, problems arise from the remarkable variations of spherical aberration, coma and distortion produced by variation of focal length. It is especially difficult to correct spherical aberration at the tele position and distortion at the wide position, and coma can hardly be corrected over the entire zooming region. In order to correct these aberrations, it is preferable for both the front lens unit and the rear lens unit to have long focal lengths. When focal length $f_I$ of the front lens unit, for example, is prolonged, however, imaging magnification $f/f_I$ (the reference symbol f represents focal length of the zoom lens system as a whole) of the rear lens unit is deviated rather remarkably from the value of 1 determined in the condition where the zoom lens system has the shortest total length, especially at the wide position, i.e., in the condition of $f=f_W$ (the reference symbol $f_W$ represents focal length of the zoom lens system as a whole at the wide position thereof). Accordingly, the distance as measured from the object point to the image point (conjugate distance) of the rear lens unit becomes very long, thereby prolonging total length of the zoom lens system. Since the distance as measured from the object point to the image point at the wide position is proportional to the focal length of the rear lens unit, total length of the zoom lens system is further prolonged by prolonging focal length $f_{II}$ of the rear lens unit. For this reason, this type of zoom lens systems 35 mm full size have low vari-focal ratios and small numerical apertures.

Lens systems to be used for video cameras and electronic still cameras having a image size as small as 1.4 to 1.5 of 35 mm have focal lengths as short as 1.4 to 1.5 of those of photographic cameras and designed compactly in proportion to the focal lengths. Taking this point into consideration, it is permissible to loosen the restriction imposed on total lengths of lens systems for video cameras and electronic still cameras, and total lengths of the lens systems are not prolonged so much even when $f/f_I$ is prettily smaller than 1.

In view of this fact, the present invention has succeeded in designing the zoom lens system having a high vari-focal ratio and a large aperture ratio by selecting focal length $f_I$ of the front lens unit so as to satisfy the following condition (3):

$$2f_W < |f_I| < 6f_W \qquad (3)$$

wherein the reference symbol $f_W$ represents focal length of the zoom lens system as a whole at the wide position thereof.

If the lower limit of the condition (3) is exceeded, distortion will be aggravated at the wide position, spherical aberration will be aggravated at the tele position and coma will be aggravated over the entire zooming region. If the upper limit of the condition (3), is exceeded, in contrast, total length of the zoom lens system as a whole will tend to be prolonged at the wide position.

BRIEF DESCRIPTION OF THE DRAWINGS

FIG. 4 through FIG. 6 show graphs illustrating aberration characteristics of the Embodiment 1 of the present invention;

FIG. 10 through FIG. 12 show curves illustrating aberration characteristics of the Embodiment 3 of the present invention.

DETAILED DESCRIPTION OF THE PREFERRED EMBODIMENTS

Figure 1:
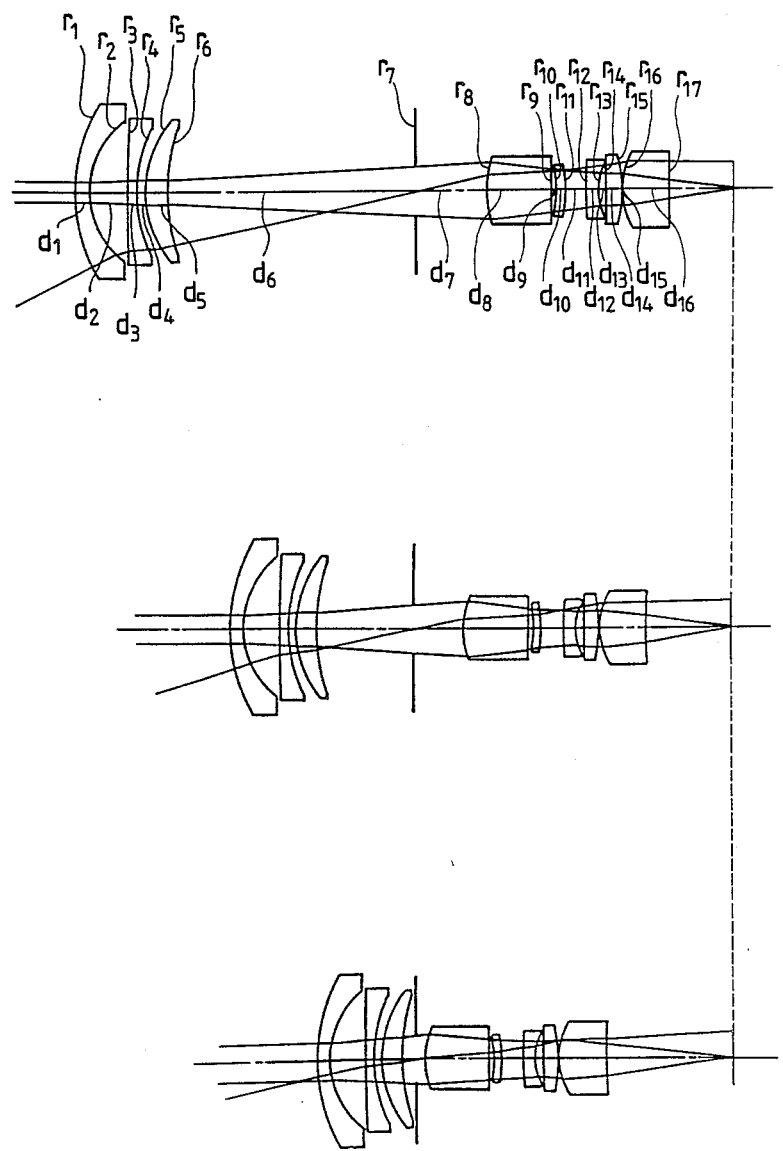
FIG. 1 through FIG. 3 show sectional views illustrating compositions of Embodiments 1 through 3 of the zoom lens system according to the present invention.

Now, the present invention will be described more detailedly with reference to the preferred Embodiments illustrated in the accompanying drawings and given in the form of the following numerical data:

Embodiment 1
$f = 7.5 \sim 21$ mm, $2\omega = 56° \sim 22°$
$F/2.8 \sim 3.8$

| | | | |
|---|---|---|---|
| $r_1 = 23.0634$ | $d_1 = 2.0000$ | $n_1 = 1.69680$ | $\nu_1 = 55.52$ |
| $r_2 = 12.4405$ | $d_2 = 5.0000$ | | |
| $r_3 = 296.6035$ | $d_3 = 1.2000$ | $n_2 = 1.69680$ | $\nu_2 = 55.52$ |
| $r_4 = 19.3348$ | $d_4 = 1.1585$ | | |
| $r_5 = 14.8870$ | $d_5 = 3.0000$ | $n_3 = 1.67270$ | $\nu_3 = 32.10$ |
| $r_6 = 28.1741$ | $d_6 = D_1$ (variable) | | |
| $r_7 = \infty$ (stop) | $d_7 = D_2$ (variable) | | |
| $r_8 = 10.7625$ | $d_8 = 8.9766$ | $n_4 = 1.69680$ | $\nu_4 = 55.52$ |
| $r_9 = -499.0286$ | $d_9 = 0.7432$ | | |
| $r_{10} = -12.4986$ | $d_{10} = 0.9165$ | $n_5 = 1.72825$ | $\nu_5 = 28.46$ |
| $r_{11} = -31.3845$ | $d_{11} = 2.9753$ | | |
| $r_{12} = 75.6562$ | $d_{12} = 1.6403$ | $n_6 = 1.72825$ | $\nu_6 = 28.46$ |
| $r_{13} = 8.7092$ | $d_{13} = 1.0000$ | | |
| $r_{14} = 60.7969$ | $d_{14} = 2.0000$ | $n_7 = 1.69680$ | $\nu_7 = 55.52$ |
| $r_{15} = -24.9633$ | $d_{15} = 0.1583$ | | |
| $r_{16} = 9.9638$ | $d_{16} = 6.2952$ | $n_8 = 1.69680$ | $\nu_8 = 55.52$ |
| $r_{17} = 60.0000$ | | | |

| f | 7.5 | 12 | 21 |
|---|---|---|---|
| $D_1$ | 35.067 | 14.039 | 2.000 |
| $D_2$ | 9.630 | 6.710 | 1.000 |

$(r_a + r_b)/(r_a - r_b) = 0.42$
$(r_c + r_d)/(r_c - r_d) = -1.40$
$f_I = -27.565$ mm

Embodiment 2
$f = 7.5 \sim 21$ mm, $2\omega = 56° \sim 22°$
$F/2.8 \sim 3.7$

| | | | |
|---|---|---|---|
| $r_1 = 26.3057$ | $d_1 = 2.0000$ | $n_1 = 1.69680$ | $\nu_1 = 55.52$ |
| $r_2 = 14.0200$ | $d_2 = 5.0000$ | | |
| $r_3 = 77.3397$ | $d_3 = 1.2000$ | $n_2 = 1.69680$ | $\nu_2 = 55.52$ |
| $r_4 = 18.5807$ | $d_4 = 1.1912$ | | |
| $r_5 = 15.0373$ | $d_5 = 3.0000$ | $n_3 = 1.69895$ | $\nu_3 = 30.12$ |
| $r_6 = 23.0339$ | $d_6 = D_1$ (variable) | | |
| $r_7 = \infty$ (stop) | $d_7 = D_2$ (variable) | | |
| $r_8 = 9.1606$ | $d_8 = 3.7140$ | $n_4 = 1.69680$ | $\nu_4 = 55.52$ |
| $r_9 = 31.8439$ | $d_9 = 0.6508$ | | |
| $r_{10} = 13.8934$ | $d_{10} = 3.8284$ | $n_5 = 1.69680$ | $\nu_5 = 55.52$ |
| $r_{11} = 39.7805$ | $d_{11} = 1.5000$ | | |
| $r_{12} = -9.6488$ | $d_{12} = 2.6875$ | $n_6 = 1.74077$ | $\nu_6 = 27.79$ |
| $r_{13} = 8.0819$ | $d_{13} = 1.5000$ | | |
| $r_{14} = 210.5635$ | $d_{14} = 2.4101$ | $n_7 = 1.69680$ | $\nu_7 = 55.52$ |
| $r_{15} = -15.5752$ | $d_{15} = 0.1624$ | | |
| $r_{16} = 11.3543$ | $d_{16} = 2.0000$ | $n_8 = 1.69680$ | $\nu_8 = 55.52$ |
| $r_{17} = -177.4587$ | | | |

| f | 7.5 | 12 | 21 |
|---|---|---|---|
| $D_1$ | 37.736 | 15.325 | 2.000 |
| $D_2$ | 8.996 | 6.291 | 1.000 |

$(r_a + r_b)/(r_a - r_b) = 0.86$
$(r_c + r_d)/(r_c - r_d) = -0.88$
$f_I = -29.327$ mm

Embodiment 3
$f = 7.5 \sim 21$ mm, $2\omega = 56° \sim 22°$
$F/2.8 \sim 3.9$

| | | | |
|---|---|---|---|
| $r_1 = 23.5150$ | $d_1 = 2.0000$ | $n_1 = 1.69680$ | $\nu_1 = 55.52$ |
| $r_2 = 12.7143$ | $d_2 = 5.0000$ | | |
| $r_3 = 115.2348$ | $d_3 = 1.2000$ | $n_2 = 1.69680$ | $\nu_2 = 55.52$ |
| $r_4 = 16.9099$ | $d_4 = 1.2716$ | | |
| $r_5 = 14.5437$ | $d_5 = 3.0000$ | $n_3 = 1.67270$ | $\nu_3 = 32.10$ |
| $r_6 = 29.3162$ | $d_6 = D_1$ (variable) | | |
| $r_7 = \infty$ (stop) | $d_7 = D_2$ (variable) | | |
| $r_8 = 9.4048$ | $d_8 = 9.1895$ | $n_4 = 1.69680$ | $\nu_4 = 55.52$ |
| $r_9 = -63.0975$ | $d_9 = 1.0000$ | | |
| $r_{10} = -9.3636$ | $d_{10} = 1.4285$ | $n_5 = 1.67270$ | $\nu_5 = 32.10$ |
| $r_{11} = 9.5615$ | $d_{11} = 0.7000$ | | |
| $r_{12} = 25.1430$ | $d_{12} = 3.0000$ | $n_6 = 1.69680$ | $\nu_6 = 55.52$ |
| $r_{13} = -22.5982$ | $d_{13} = 0.1624$ | | |
| $r_{14} = 16.5896$ | $d_{14} = 5.7135$ | $n_7 = 1.69680$ | $\nu_7 = 55.52$ |
| $r_{15} = -107.0930$ (aspherical surface) | | | | aspherical surface coefficients
$E = 0.61505 \times 10^{-5}$, $F = 0.80633 \times 10^{-7}$

| f | 7.5 | 12 | 21 |
|---|---|---|---|
| $D_1$ | 36.617 | 15.448 | 3.000 |
| $D_2$ | 8.890 | 6.220 | 1.000 |

$(r_a + r_b)/(r_a - r_b) = 0.05$
$(r_c + r_d)/(r_c - r_d) = -0.73$
$f_I = -28.762$ mm wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

Figure 2:
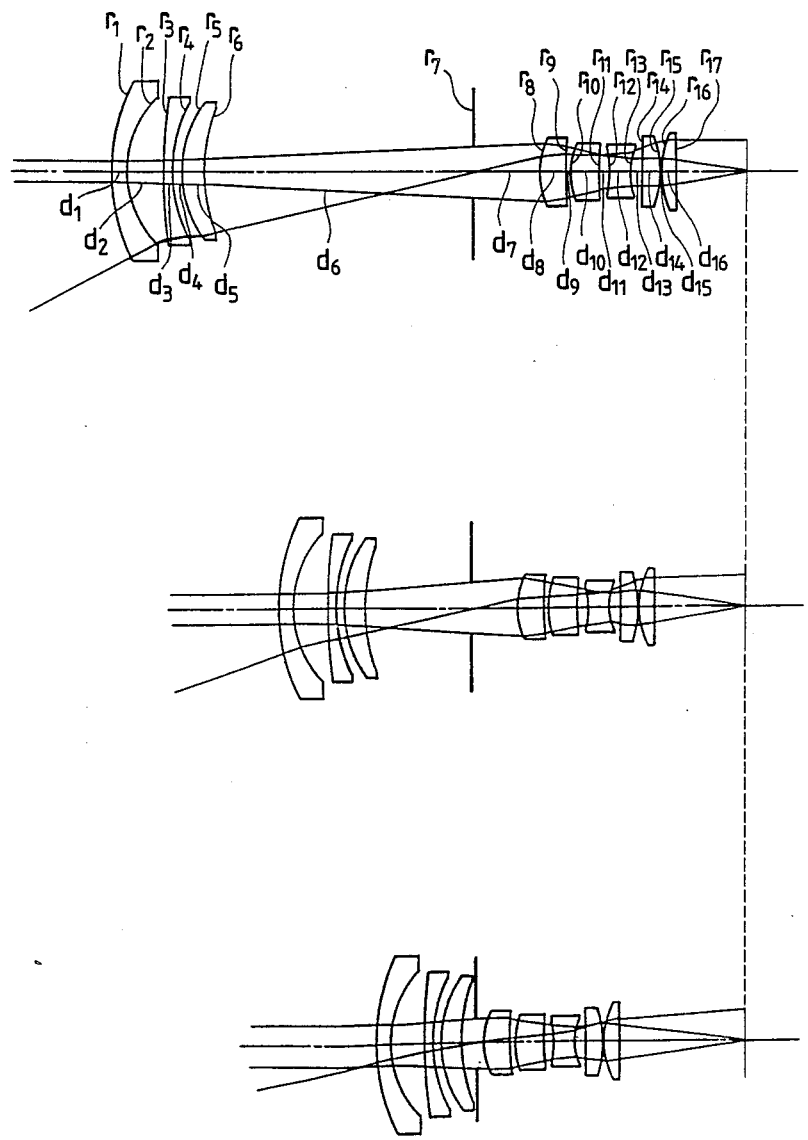
Figure 3:
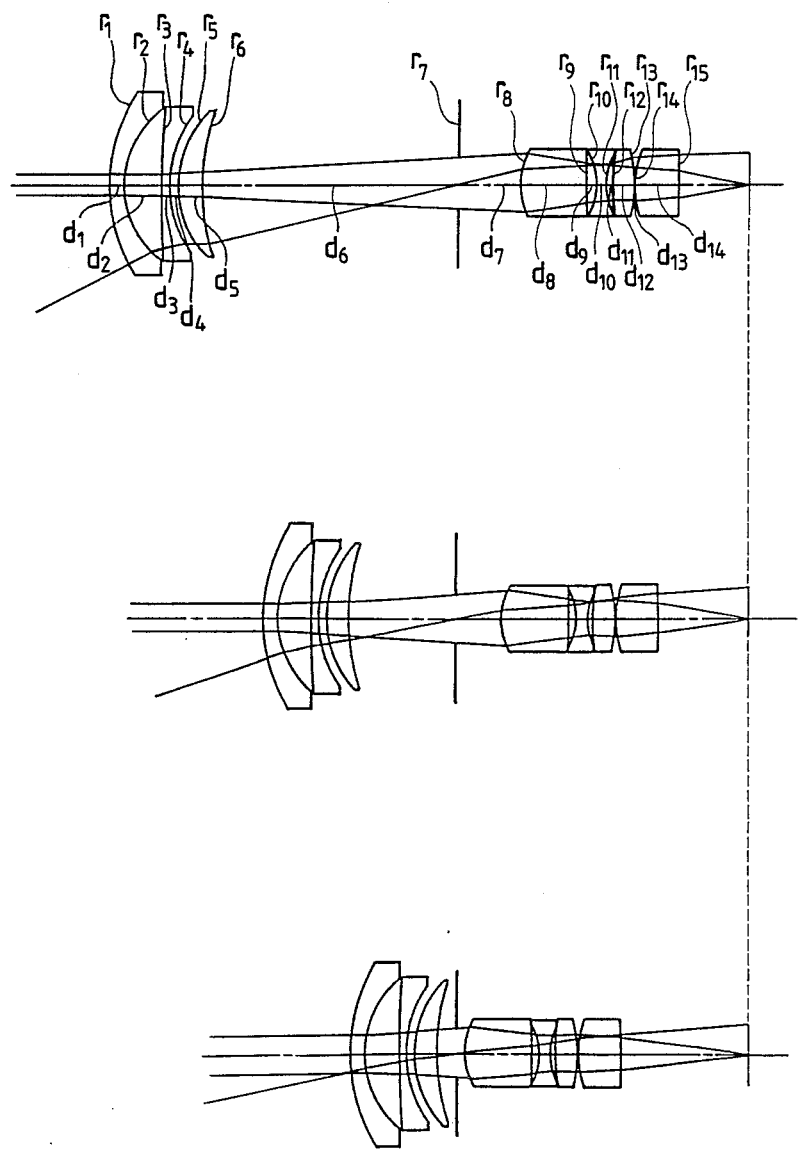

The Embodiments 1 through 3 described above have the compositions illustrated in FIG. 1 through FIG. 3 respectively and designed as zoom lens systems each consisting of two lens units.

As illustrated in these Embodiments, the zoom lens system according to the present invention comprises a stop arranged between the front lens unit and the rear lens unit. Since this stop is held stationary during zooming, it serves for simplifying structure of the barrel of the lens system.

In the Embodiment 3, an aspherical surface is used as the extreme image side surface of the positive lens component arranged on the extremely image side in the rear lens unit. When the direction along the optical axis is taken as the x axis and the direction perpendicular to the optical axis is taken as the y axis, shape of this aspherical surface is expressed by the following formula:

$$y = \frac{x^2/r}{1 + \sqrt{1 - (x/r)^2}} + Ex^4 + Fx^6 + Gx^8 + \ldots$$

wherein the reference symbol r represents radius of curvature at the vertex of the aspherical surface, and the reference symbols $E, F, G, \ldots$ designates, the aspherical surface coefficients.

Figure 6:
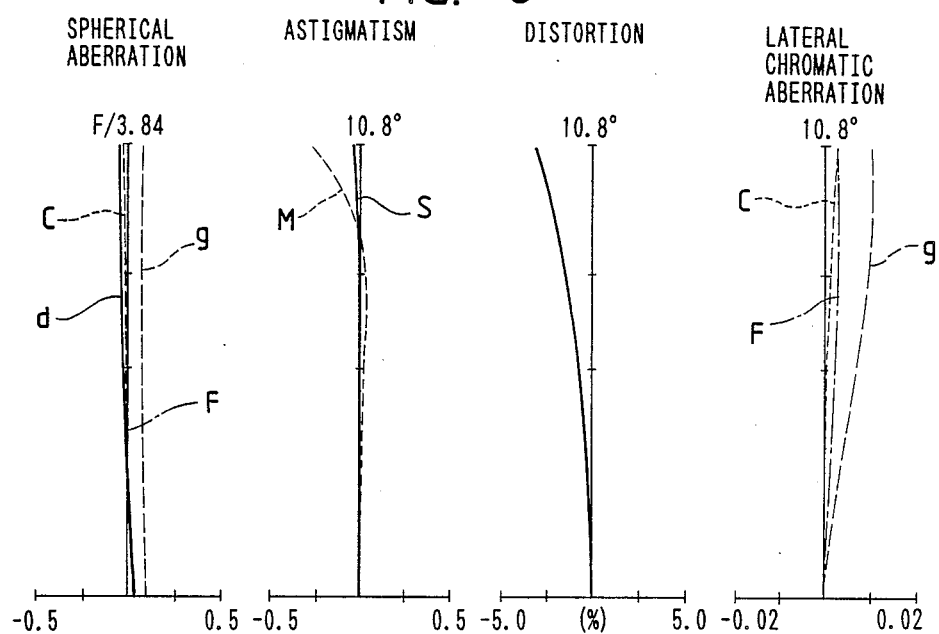
Figure 7:
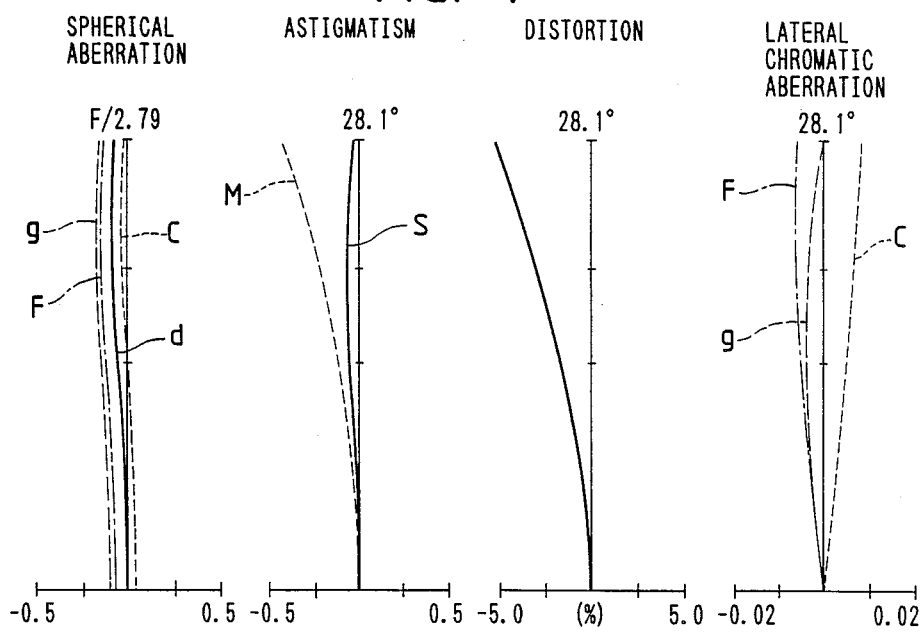
FIG. 7 through FIG. 9 show graphs illustrating aberration characteristics of the Embodiment 2 of the present invention.
Figure 8:
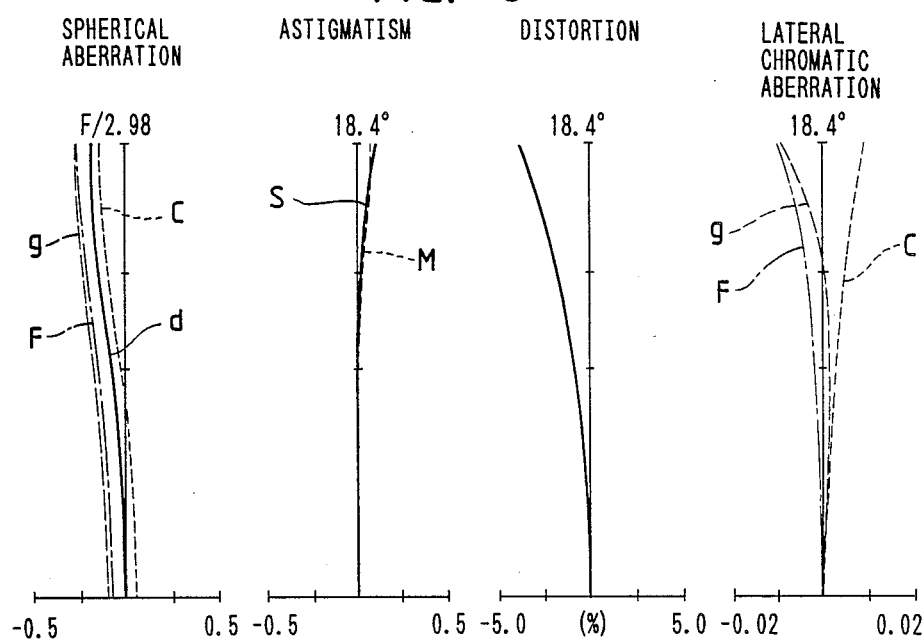
Figure 9:
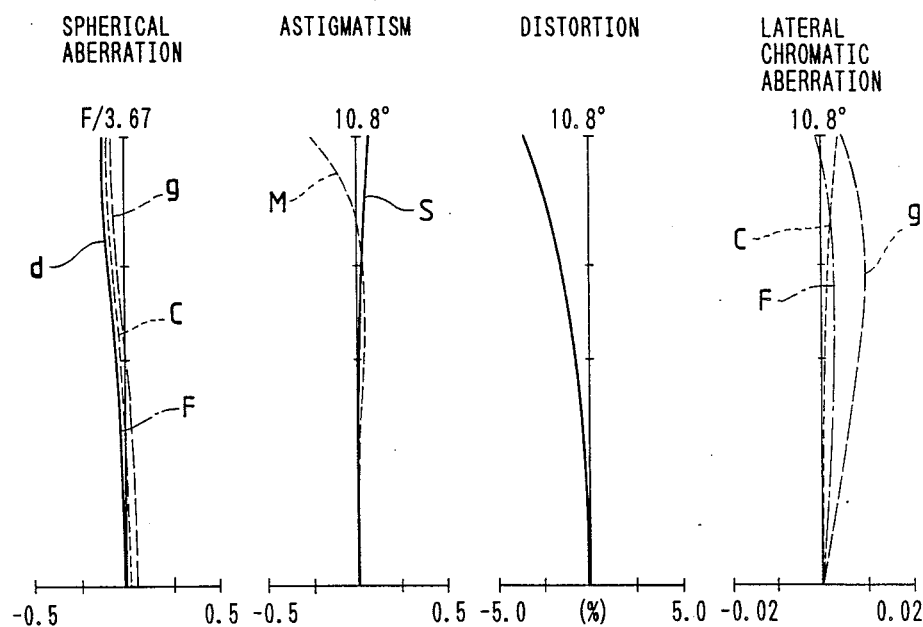
Figure 10:
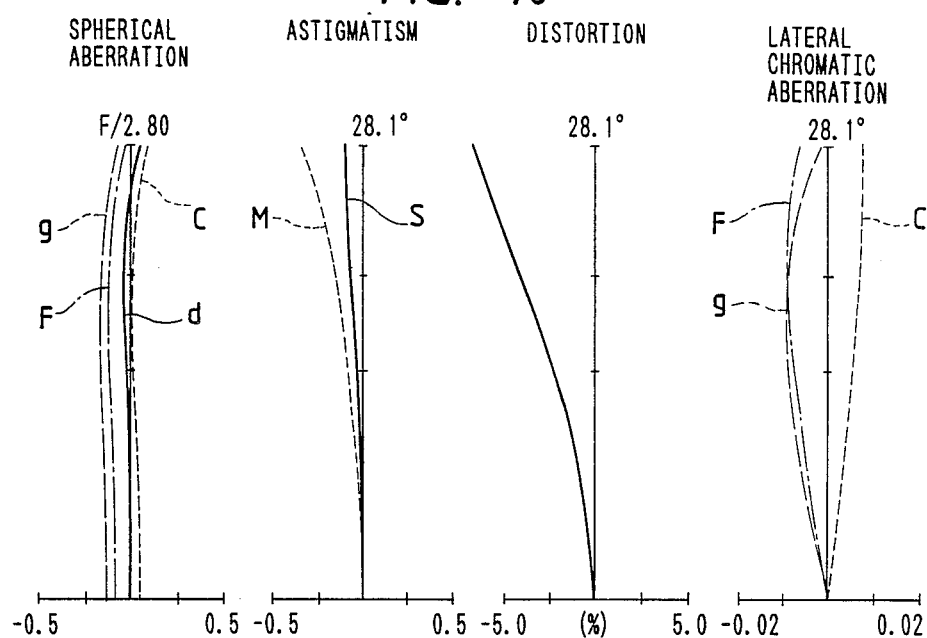
Figure 11:
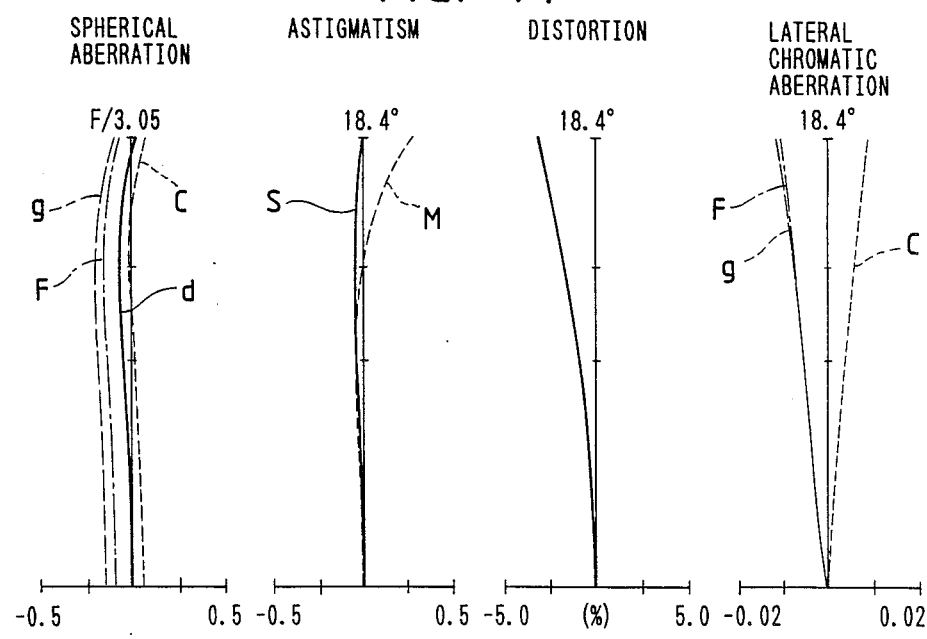

Aberration characteristics at the wide position, intermediate focal length and tele position of the Embodiment 1 are illustrated in FIG. 4, FIG. 5 and FIG. 6 respectively, aberration characteristics at the wide position, intermediate focal length and tele position of the Embodiment 2 are visualized in FIG. 6, FIG. 8 and FIG. 9 respectively, and aberration characteristic at the wide position, intermediate focal length and tele position of the Embodiment 3 are shown in FIG. 10, FIG. 11 and FIG. 12 respectively.

The zoom lens system according to the present invention makes the most of the merits of the zoom lens which consists of two lens units and has a large field angle in addition to a long back focal length, and is a lens system which is compact in external design, light in weight, designed for a high zooming ratio and a high aperture ratio, and suited for use with video cameras.

We claim:

1. A zoom lens system comprising a front lens unit having negative refractive power and a rear lens unit having positive refractive power arranged in the order from the object side, and so designed as to perform variation of focal length by varying the airspace between said front lens unit and rear lens unit, said rear lens unit comprising a positive lens component consisting of two positive lens elements arranged on the extreme image side therein, the positive lens element arranged on the object side in said positive lens component having a radius of curvature on the object side surface thereof longer than that of the image side surface thereof, the positive lens element arranged on the image side of said positive lens component having a radius of curvature on the image side surface thereof longer than that of the object side surface thereof, and said positive lens elements being so designed as to satisfy the following conditions (1) and (2):

$$0 < (r_a + r_b)/(r_a - r_b) < 1.5 \quad (1)$$

$$-1.5 < (r_c + r_d)/(r_c - r_d) < 0 \quad (2)$$

wherein the reference symbols $r_a$ and $r_b$ designate radii of curvature on the object side surface and the image side surface respectively of the positive lens element arranged on the object side in said positive lens component, and the reference symbol $r_c$ and $r_d$ designate radii of curvature on the object side surface and the image side surface respectively of the positive lens element arranged on the image side in said positive lens component.

2. A zoom lens system according to claim 1 wherein said front lens unit comprises, in the order from the object side, a negative lens element, a negative lens element and a positive lens element.

3. A zoom lens system according to claim 1 or 2 wherein any one of the surfaces of said positive lens component is designed as an aspherical surface having its radius of curvature prolonged as the distance from the optical axis becomes longer.

4. A zoom lens system according to claim 3 satisfying the following condition(3):

$$2f_w < |f_I| < 6f_w \quad (3)$$

wherein the reference symbol $f_w$ represents focal length of the zoom lens system as a whole at a wide position thereof and the reference symbol $f_I$ designates focal length of the front lens unit.

5. A zoom lens system according to claim 4, comprising a stop kept at a fixed location between the front lens unit and rear lens unit.

6. A zoom lens system according to claim 3, comprising a stop kept at a fixed location between the front lens unit and rear lens unit.

7. A zoom lens system according to claim 1 or 2 satisfying the following condition (3):

$$2f_W < |f_I| < 6f_W \quad (3)$$

wherein the reference symbol $f_w$ represents focal length of the zoom lens system as a whole at the wide position thereof and the reference symbol $f_I$ designates focal length of the front lens unit.

8. A zoom lens system according to claim 7, comprising a stop kept at a fixed location between the front lens unit and rear lens unit.

9. A zoom lens system according to claim 1 or 2 comprising a stop kept at a fixed location between the front lens unit and the rear lens unit.

* * * * *